July 17, 1956   K. J. KOLLMANN   2,755,115
SHAFT COUPLING
Filed May 17, 1950

INVENTOR.
Karl J. Kollmann
BY
Florian G. Miller
Atty.

United States Patent Office

2,755,115
Patented July 17, 1956

2,755,115

SHAFT COUPLING

Karl J. Kollmann, Erie, Pa.

Application May 17, 1950, Serial No. 162,528

1 Claim. (Cl. 287—76)

This invention relates generally to couplings and more particularly to couplings for connecting together open, helically wound rods.

All couplings of this character, made in accordance with the teachings of the prior art, and with which I am familiar, have not been adaptable for connecting open, helically wound rods and considerable time and labor is necessary to connect and disconnect the couplings. Furthermore, when these prior couplings are subjected to severe bends, stresses, impacts, and the like, such as when helically wound sections of a sewer cleaning coil are connected together by couplings, they become disconnected and the sewer line must be dug up. Different types of couplings utilizing transverse pins have been heretofore used for connecting coiled wires together but it has been found that due to the heavy stresses and lateral impacts caused when the coils move around severe bends, the pins shear off or they are driven laterally outwardly thereby leaving part of the connected coil in the sewer line. This requires digging through the earth to the sewer line and removing the lengths of wire therefrom at great expense and greatly damaging the lawn and shrubbery.

It is, accordingly, an object of my invention to overcome the above and other defects in couplings and it is more particularly an object of my invention to provide a coupling for connecting rods together which is simple in construction, economical in cost, economical in manufacture, and efficient in operation.

Another object of my invention is to provide a coupling which may be connected and disconnected in a minimum of time.

Another object of my invention is to provide novel means in a coupling for connecting the ends of open helically wound rods.

Another object of my invention is to provide a coupling for connecting rods together which will not become uncoupled upon rotation thereof while in a bent condition.

Other objects of my invention will become evident from the following detailed description, taken in conjunction with the accompanying drawings, in which Fig. 1 is a side elevational view in vertical cross section of my novel coupling;

Figure 1:
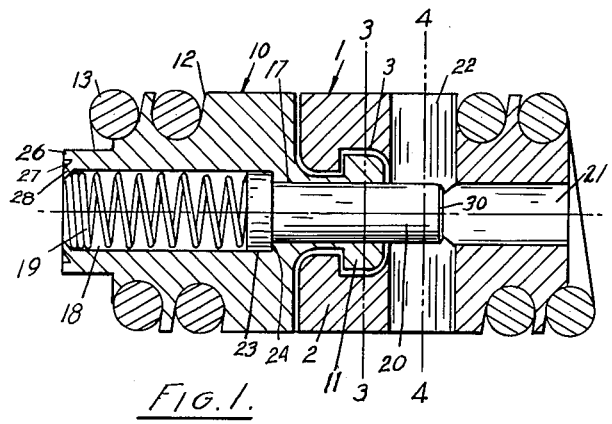

Referring now to the drawings, I show in Figs. 1 to 4 inclusive a female coupling member 1 having a projecting connecting portion 2 with a transverse T-slot 3. A locking lip 4 on the female member 1 secures the end 5 of a helically wound rod 6 in threadable engagement with the threaded portion 8 of the female member 1. A groove 7 adjacent the lip 4 is milled or cut parallel to a tangential line on the periphery of the female member 1 adjacent the lip 4 whereby the lip 4 may be peened over the end 5 of the rod 6 to secure it in the groove 7. The female member 1 has a bore 21 and a transversely extending aperture 22.

Figure 2:
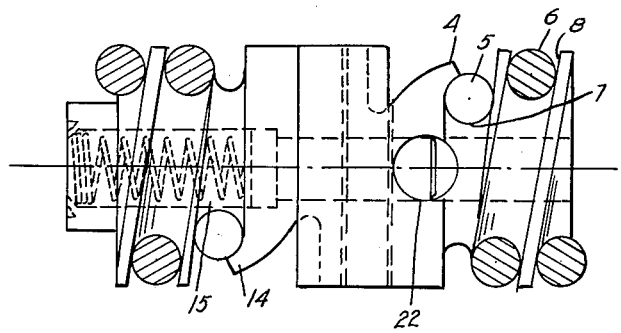
Fig. 2 is a side elevational view of my novel coupling.
Figure 3:
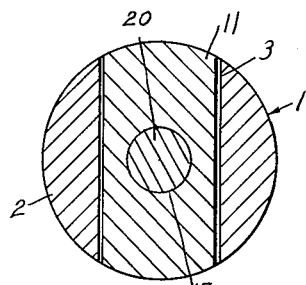
Fig. 3 is a view taken on the line 3—3 of Fig. 1.
Figure 4:
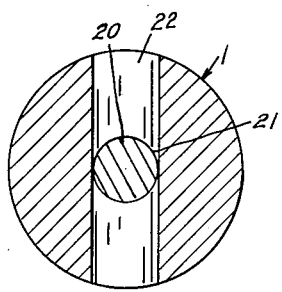
Fig. 4 is a view taken on the line 4—4 of Fig. 1.

A male member 10 has an outwardly extending T-shaped projection 11 for interlocking engagement with the T-shaped transverse slot 3 in the projection 2 of the female member 1. The male member 10 has a threaded portion 12 for threadably engaging the end of a helically wound rod 13. The end of the helically wound rod 13 is secured by a locking lip 14, as shown in Fig. 2, in a groove 15 adjacent the lip 14 which is milled or cut parallel to a tangential line on the periphery of the male member 10 whereby the lip 14 may be peened over the end of the rod 13 to lock it in the groove 15.

The male member 10 has a bore 17 and a counterbore 18 extending axially therethrough, the counterbore 18 receiving a coil spring 19 which urges a pin 20 slidable in the bore 17 into the bore 21 in the female member 1. The pin 20 has an outwardly directed flange 23 on one end thereof engaged by the spring 19, the flange 23 engaging an internal shoulder 24 in the male member 10 to limit the longitudinal movement of the pin 20 in one direction. The other end 30 of the pin 20 has a slight taper. The end 26 of the male member 10 has an annular groove 27, the inner portion 28 of which is peened or formed inwardly as shown in Fig. 1 to hold the spring 19 in the counterbore 18 of the male member 10.

It will be noted that the threaded portions 8 and 12 of the female and male members 1 and 10 respectively are opposite in direction in order that the lengths of open helically wound rods 6 and 13 will tend to move towards the coupling members 1 and 10 upon rotation thereof. The threads may be reversed from the direction as shown in the drawings if desired without departing from my invention.

In operation, the coupling shown in Figs. 1 to 4 inclusive is uncoupled by extending a conventional tapered drift pin into the transversely extending aperture 22 in the female member 1 to engage the tapered end 30 of the pin 20 to force it longitudinally against the force of the spring 19. The drift pin forces the pin 20 longitudinally out of the transversely extending aperture 22 in the female member 1 sufficiently to permit transverse relative movement between the projecting portions 2 and 11 of the female member 1 and the male member 10 respectively so that unlocking or uncoupling of the coupling members 1 and 10 is accomplished by merely moving the projecting end 11 of the male member 10 transversely in the slot 3 in the projecting portion 2 of the female member 1 until it is free therefrom. Upon connection of my novel coupling members 1 and 10, the pin 20 is moved against the force of the spring 19 until the tapered end 30 thereof is even with the outer end of the projecting portion 11 of the male member 10. The projecting portion 11 is then moved transversely in the cross slot 3 in the projecting portion 2 of the female member 1 until the pin 20 registers with the bore 21 in the female member 1 when the spring 19 moves it longitudinally into the bore 21 in the female member 1. The flange 23 on the pin 20 limits the longitudinal movement of the pin 20 so that there is space between the side wall of the transversely extending aperture 22 in the female member 1 and the tapered end 30 of the pin 20 whereby the end of a tapered drift pin can be disposed therebetween to move the pin 20 longitudinally against the force of the spring 19.

The projection 11 on the male member 10 and the corresponding slot 3 in the female member 1 may be dovetailed or any other suitable shape without departing from my invention.

It will be evident from the foregoing description that I have provided a novel coupling which will not become disconnected upon rotation thereof, which has no projecting parts to be sheared, which is very simple in construction and easy to connect and disconnect, which is especially adaptable for connecting lengthwise any type of rod and particularly open helically wound rods, and which has further novel means for locking the ends of open helically wound rods onto the coupling members.

Various changes may be made in the specific embodiment of my invention without departing from the spirit thereof or from the scope of the appended claim.

What I claim is:

In combination, a coupling and two flexible shafts adapted to be coupled thereby comprising a first and a second coupling member, each having two ends, means on one end of each member attaching it to one said shaft, a transversely extending generally T-shaped slot in the other end of said first coupling member, a transversely extending aperture in said first member disposed substantially at right angles to said T-shaped slot, said aperture communicating with said slot, the other end of said second coupling member having a male member having a head connected to one end thereof by a neck portion, said head having two flat shoulders extending outward from said neck portion and generally perpendicular to said neck and disposed in said slot, said T-shaped slot having two flat shoulders disposed generally perpendicular to the longitudinal axis thereof and engaging said head member shoulders when said head is disposed in said slot, means to lock said head in said slot against lateral sliding, said locking means comprising a centrally disposed axial bore in said male member extending through said head on said male member, and a locking pin disposed in said axial bore and extending into said transverse aperture in said first member, said transverse aperture being adapted to receive a wedge shaped pin whereby said locking pin may be forced out of said transverse aperture and said head slid laterally in said slot to remove it therefrom and thereby separate said shafts, said axial bore in said male member being counterbored at the end thereof remote from said head thereon and said locking pin having a head thereon disposed in said counterbore, and a spring disposed in said counterbore adapted to urge said locking pin into said transverse aperture in said first member, said head adapted to engage said male member at the end of said counterbore adjacent said head to limit the movement of the pin therein whereby the pin has one end terminating in spaced relation to one wall of said transverse aperture.

References Cited in the file of this patent

UNITED STATES PATENTS

| Number | Name | Date |
|---|---|---|
| 694,514 | Wulff | Mar. 4, 1902 |
| 1,250,509 | Rigby | Dec. 18, 1917 |
| 1,502,528 | Ruelbach | July 22, 1924 |
| 1,784,683 | Schweigert | Dec. 9, 1930 |
| 1,787,831 | Morue | Jan. 6, 1931 |
| 1,805,014 | Schalk | May 12, 1931 |
| 1,834,425 | Schalk | Dec. 1, 1931 |
| 2,091,378 | Simpson | Aug. 31, 1937 |
| 2,521,172 | Kollmann | Sept. 5, 1950 |